US012462297B2

(12) United States Patent
Pascal

(10) Patent No.: US 12,462,297 B2
(45) Date of Patent: Nov. 4, 2025

(54) APPARATUS AND METHOD FOR TRACKING FRAUDULENT ACTIVITY

(71) Applicant: Lilith and Co. Incorporated, Boston, MA (US)

(72) Inventor: Sebastian Pascal, Marlborough, MA (US)

(73) Assignee: Lilith and Co. Incorporated

( * ) Notice: Subject to any disclaimer, the term of this patent is extended or adjusted under 35 U.S.C. 154(b) by 0 days.

(21) Appl. No.: 18/639,135

(22) Filed: Apr. 18, 2024

(65) Prior Publication Data

US 2024/0354840 A1 Oct. 24, 2024

Related U.S. Application Data

(60) Provisional application No. 63/460,360, filed on Apr. 19, 2023.

(51) Int. Cl.
*G06Q 40/00* (2023.01)
*G06Q 40/02* (2023.01)
*H04L 67/306* (2022.01)

(52) U.S. Cl.
CPC .......... *G06Q 40/02* (2013.01); *H04L 67/306* (2013.01)

(58) Field of Classification Search
CPC .............................. G06Q 40/02; H04L 67/306
USPC ..... 726/23, 25; 705/16, 26.35, 4, 35, 39, 37, 705/38, 40; 709/238, 224, 225; 707/769, 707/706; 701/2; 703/6
See application file for complete search history.

(56) References Cited

U.S. PATENT DOCUMENTS

| | | | | |
|---|---|---|---|---|
| 10,134,041 | B2* | 11/2018 | Cowan | G06Q 20/12 |
| 10,911,466 | B2* | 2/2021 | Ochi | H04L 63/145 |
| 11,722,491 | B1* | 8/2023 | Al-Rashid | H04L 63/1433 |
| 12,217,004 | B2* | 2/2025 | Lee | G06N 20/00 |
| 2011/0112931 | A1* | 5/2011 | Hu | G06Q 30/0609 |
| | | | | 705/26.35 |

(Continued)

FOREIGN PATENT DOCUMENTS

EP 3889871 A1 10/2021

OTHER PUBLICATIONS

A Method of Fraud & Intrusion Detection for E-payment Systems in Mobile e-Commerce; 2007 IEEE International Performance, Computing, and Communications Conference (2007, pp. 395-401); Pallapa Venkataram, B.Sathish Babu, M.K Naveen, G.H. Samyama Gungal; Apr. 11, 2007. (Year: 2007).*

(Continued)

*Primary Examiner* — Tien C Nguyen

(57) ABSTRACT

An apparatus and method for tracking fraudulent activity that will impact financial and economic integrity, the apparatus including a user database, at least a processor, and a memory containing instructions and communicatively connected to the processor. The memory containing instructions may configure the processor to implement a method for tracking fraudulent activity that will impact financial and economic integrity. The method may include receiving one or more identification data, receiving, from the user database, a user profile associated with one or more identification data, receiving, from the user database, one or more local fraud risk factors, securely identifying an individual as a function of the score and one or more identification data, initiating one or more security parameters, and generating an alert as a function of the user profile.

20 Claims, 9 Drawing Sheets

(56) References Cited

U.S. PATENT DOCUMENTS

| | | | | |
|---|---|---|---|---|
| 2013/0024300 | A1* | 1/2013 | Choudhuri | G06Q 30/018 |
| | | | | 705/16 |
| 2013/0325681 | A1* | 12/2013 | Somashekar | H04M 15/851 |
| | | | | 705/35 |
| 2014/0089193 | A1* | 3/2014 | Boding | G06Q 20/382 |
| | | | | 705/44 |
| 2014/0380478 | A1* | 12/2014 | Canning | H04L 63/1416 |
| | | | | 726/23 |
| 2017/0178124 | A1* | 6/2017 | Havilio | G06Q 20/382 |
| 2017/0345004 | A1* | 11/2017 | Cowan | G06Q 20/4016 |
| 2017/0357977 | A1* | 12/2017 | Pitz | G06Q 20/4016 |
| 2018/0350006 | A1* | 12/2018 | Agrawal | G06F 7/08 |
| 2019/0052661 | A1* | 2/2019 | Anand | H04L 63/083 |
| 2019/0303940 | A1* | 10/2019 | Miller | G06Q 20/407 |
| 2021/0073819 | A1* | 3/2021 | Hernandez | G06Q 20/4016 |
| 2021/0081948 | A1* | 3/2021 | Kala | G06N 20/20 |
| 2021/0304206 | A1* | 9/2021 | Juneja | G06Q 20/206 |
| 2022/0006899 | A1 | 1/2022 | Phatak | |
| 2022/0101330 | A1* | 3/2022 | Ivey | G06Q 20/4016 |
| 2022/0253856 | A1* | 8/2022 | Wong | G06N 3/088 |
| 2023/0059064 | A1 | 2/2023 | Benkreira | |

OTHER PUBLICATIONS

Towards Fraud Detection Methodologies; 2010 5th International Conference on Future Information Technology (2010, pp. 1-6); Allan, T., Zhan, J.; May 1, 2010. (Year: 2010).*

Online Transaction Fraud Detection System; 2021 International Conference on Advance Computing and Innovative Technologies in Engineering (ICACITE) (2021,pp. 14-16); I. Mettildha Mary, M. Priyadharsini, Karuppasamy. K, Margret Sharmila. F, Mar. 4, 2021.. (Year: 2021).*

* cited by examiner

APPARATUS AND METHOD FOR TRACKING FRAUDULENT ACTIVITY

CROSS-REFERENCE TO RELATED APPLICATIONS

This application claims the benefit of priority of U.S. Provisional Patent Application Ser. No. 63/460,360, filed on Apr. 19, 2023, and titled "AN APPARATUS AND METHOD FOR TRACKING FRAUDULENT ACTIVITY," which is incorporated by reference herein in its entirety.

FIELD OF THE INVENTION

The present invention generally relates to the field of tracking activity. In particular, the present invention is directed to an apparatus and method for tracking fraudulent activity.

BACKGROUND

Current systems for tracking fraudulent activity and maintaining secure access to sites dealing with confidential information are underwhelming. Even further, current systems lack connectivity that allows for communication of fraudulent activity across a variety of platforms leaving entities vulnerable to fraud.

SUMMARY OF THE DISCLOSURE

In an aspect, the present disclosure illustrates an apparatus for tracking fraudulent activity. In an embodiment, an apparatus for tracking fraudulent activity includes a user database, at least a processor, and a memory communicatively connected to the processor. The memory may contain instructions configuring the processor to receive one or more identification data, receive from the user database, a user profile associated with one or more identification data, receive, from the user database, one or more local fraud risk factors, generate a score as a function of the user profile and one or more local fraud risk factors, securely identify an individual as a function of the score and one or more identification data, initiate one or more security parameters, and generate an alert as a function of a user profile.

In another aspect, the present disclosure illustrates methods for tracking fraudulent activity. In an embodiment, a method for tracking fraudulent activity may include receiving one or more identification data, receiving, from the user database, a user profile associated with one or more identification data, receiving, from the user database, one or more local fraud risk factors, generating a score as a function of the user profile and one or more local fraud risk factors, securely identifying an individual as a function of the score and one or more identification data, initiating one or more security parameters, and generating an alert as a function of a user profile.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for tracking fraudulent activity. In an embodiment, fraudulent activity may relate to one or more financial institutions. In an embodiment, an apparatus for tracking fraudulent activity may include a user database, at least a processor, and a memory communicatively connected to the processor. The memory may contain instructions configuring the processor to undergo a method for tracking fraudulent activity. In an embodiment, a method for tracking fraudulent activity may include receiving one or more identification data, receiving, from the user database, a user profile associated with the one or more identification data, receiving, from the user database, one or more local fraud risk factors, securely identifying an individual as a function of the score and one or more identification data, generating a score as a function of the user profile and one or more local fraud risk factors, initiating one or more security parameters, and generating an alert as a function of the a user profile.

Aspects of the present disclosure may be utilized to identify fake identification that may be used to commit fraudulent activity, alert other communities of fraudulent activity, and/or score/predict the likelihood of fraudulent activity occurring at a given financial institution. Exemplary embodiments illustrating aspects of the present disclosure are described below in the context of several specific examples.

Figure 1:
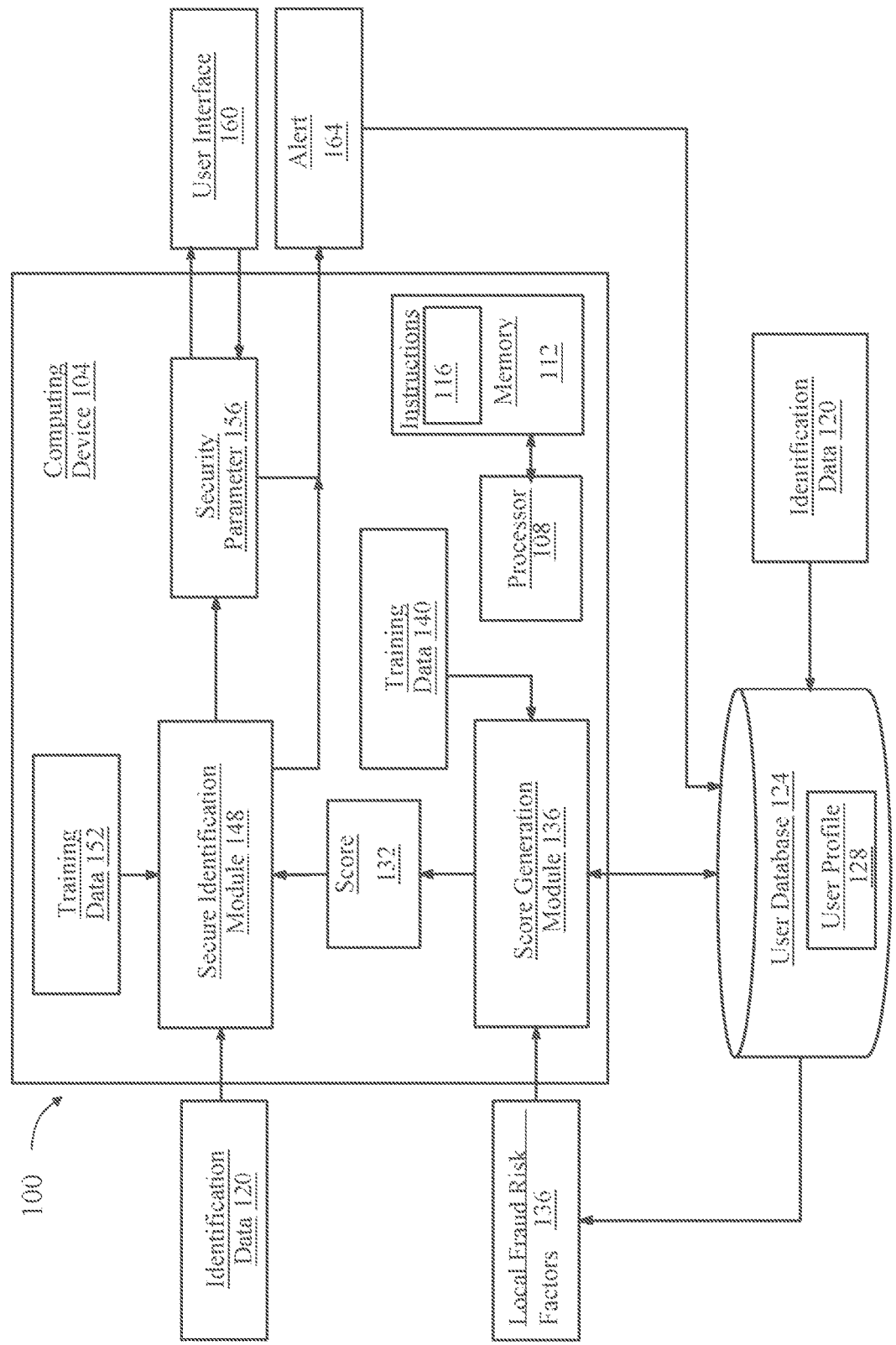
FIG. 1 is a block diagram of an apparatus for tracking fraudulent activity.

Referring now to FIG. 1, an exemplary embodiment of an apparatus for tracking fraudulent activity 100 is illustrated. Apparatus 100 includes user database 124, at least a processor, and a memory communicatively connected to the processor. The memory may contain instructions 116 configuring the processor to receive one or more identification data 120, receive, from user database 124, user profile 128 associated with the one or more identification data 120, receive, from user database 124, one or more local fraud risk factors 144, generate score 132 as a function of user profile 128 and the one or more local fraud risk factors 144, securely identify an individual as a function of score 132 and one or more identification data 120, initiate one or more security parameters 156, and generate alert 164 as a function of the user profile 128.

With continued reference to FIG. 1, apparatus 100 may include a computing device 104. Computing device 104 includes a processor 108 and a memory 112 communicatively connected to the processor 108, wherein memory 112 contains instructions 116 configuring processor 108 to implement method 800 as described below. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. Processor 108 and memory 112 may be contained in computing device 104. Alternatively, processor 108 and memory 112 may exist apart from computing device 104 and transmit information to computing device 104 from an off-site location.

With further reference to FIG. 1, computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing devices operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referencing FIG. 1, apparatus 100 may be configured to implement fraud detection in accordance with the embodiments herein disclosed in harmony with and/or in furtherance of one or more legacy systems. "Legacy systems," as used throughout this disclosure, refers to systems, such as computer systems, hardware, and/or software that are still in use and were used prior to the introduction of a new system. This includes but is not limited to, cameras, microphones, other security systems, and/or the like, whether they are inside and/or outside and/or embedded in a device, such as a phone. Legacy system data may be integrated into the fraud detection process by way of identification data (ID) 120. Additionally, up and coming technology and/or detection systems may be integrated into the present system in the same way.

Still referring to FIG. 1, apparatus 100 may be configured to receive identification data 120. "Identification data," as used herein is information related to the identity of a person and may otherwise be referred to as ID. For example, ID 120 may include a valid driver's license, birth certificate, state-issued identification card, student identification card, social security card, military identification card, passport or passport card, and/or the like. Furthermore, ID 120 may include biographical and/or location data, such as, but without limitation, fingerprints, eye scans, physical movements and associated patterns (such as patterns to unlock a phone), facial recognition, voice recording and recognition, geo location, and/or geo fencing data. ID 120 may include data related to identifying information of a person affiliated with a particular bank branch and/or generally affiliated with a bank. For example, ID 120 may include Bank Identification Number (BIN), account number, routing number, International Bank Account Number (IBAN), and/or the like associated with a person and their affiliated bank. ID 120 may be received through a graphical user interface, immutable sequential listing, and/or databases as described throughout this disclosure. ID 120 may identify an individual and/or an entity. An "entity" as used in this disclosure includes any organization founded by one or more natural persons to facilitate specific activities. An entity may include a business entity such as a corporation, association, partnership, limited liability company, limited liability partnership, or other legal entity. An entity may additionally include a non-profit entity such as a charity, private foundation, and/or political organization.

Still referring to FIG. 1, ID 120 may include fraud data. "Fraud data," as used herein, is information related to fraudulent activity; fraudulent activity may include, without limitation, fraudulent activity that can impact financial and/or economic integrity. Fraud data may include information regarding reported fraudulent activity of a person related to pecuniary/financial services, such as, but not limited to services related to financial consulting firms, banks, accounting firms, trusts, and/or hedge funds. "Fraudulent activity," as used herein, is an act performed with the intention of obtaining an unauthorized benefit, such as money or property, by deception or other unethical means. Fraud data may relate to embezzlement, misappropriation or other financial irregularities; forgery or alteration of documents (checks, time sheets, contractor agreements, purchase orders, other financial documents, electronic files); improprieties in the handling or reporting of money or financial transactions; misappropriation of funds, securities, supplies, inventory, or any other asset (including furniture, fixtures or equipment); authorizing or receiving payment for goods not received or services not performed; authorizing or receiving payments for hours not worked; Ponzi schemes; card skimming; using artificial intelligence to impersonate an individual and/or an entity; and/or the like. For example, Person A may have a record of writing bad checks. As used within this disclosure, "writing a bad check," is defined as writing a check for a nonexistent account or on an account with insufficient funds to cover the amount the check was written for. Fraud data may include fake identification and/or aliases a person has previously or continues to use, the type and quantity of fraudulent activity, and the like. For example, data may include fake checks, fake invoices, fake pay stubs, fake tax returns, and/or the like. Fraud data may additionally include data relating to other crimes of fraud, such as, without limitation, voter fraud. Fraud committed in the furtherance of any crime may indicate a higher likelihood that an individual may commit financial fraud and therefore may increase an individual's score 132.

Continuing to reference FIG. 1, ID 120 may further include facial recognition data. Facial recognition is a way of identifying or confirming an individual's identity using their facial features. Facial recognition data may be obtained from photos, videos, and/or in real time. Facial recognition data may be obtained by one or more cameras located in the vicinity of a user. For example, and without limitation one or more cameras may be located on the front of an Automated Teller Machine (ATM). As a further non-limiting example, one or more cameras may be located at a bank window or in the bank drive-thru, positioned in such a way as to capture facial recognition data of individuals using the space. These cameras may be configured to detect facial features and locate an image of a face, either alone or in a crowd, analyze said facial features, convert the image to data, and find a match of the facial features in a database of faces. The database of faces may include prior offenders and/or all consumer profiles associated with a particular bank. Consumer profiles may be further broken down with the indication of a consumer's general habits in relation to their specific branch use, typical times of visits, general quantity of visits in a given time span, and/or the like. This may be used as ID 120 if stored as ID by a bank and/or other entity. Alternatively, this information, as well as all other embodiments of ID 120 may be stored in user database 124. ID 120 may be organized in a way that allows ID 120 of a specific individual to be associated with other ID 120 of that individual. This organization may be referred to as user profile 128. User profile 128 may contain a variety of ID 120 related to a specific individual. In an embodiment, ID 120 that is not associated with a specific individual but is associated with fraudulent activity may be stored in user database 124. Analysis of facial recognition and the correlation to stored information of a given user may be facilitated by the instantiation of a machine-learning model or a neural network. Training data that may be used to train the machine-learning model and/or the neural network may include exemplary input data, such as without limitation, prior fraudster facial recognition data, current and/or past consumers' facial recognition data, public criminal records pertaining to fraud, activity patterns of past and current consumers, and/or the like, where each such example may be correlated to additional exemplary output data such as, without limitation, scores 132, which may indicate the level of threat of fraud, activity patterns of consumers, prior fraudster facial recognition data, past and present consumer facial recognition data, and/or the like. Training of the model/network may take place either at apparatus 100 and/or remotely; in the latter case, the model/network may be deployed at or by apparatus 100 in any manner as described within this disclosure. Additionally, in some embodiments, the machine-learning model and/or the neural network may be updated to apparatus 100, the model/network may be deployed at or by apparatus 100 in any manner as described in this disclosure. The machine-learning model and/or neural network may be deployed/instantiated once trained in any form as described within this disclosure. Feedback from the deployment of the machine-learning model and/or neural network may be turned into new training data, which may be stored either locally and/or transmitted to another device and used for retraining of the model/network. Retraining may be administered either remotely or at apparatus 100. Following the retraining of the model/network, redeployment/instantiation may be accomplished at or by apparatus 100 in any manner as described within this disclosure.

With further reference to FIG. 1, ID 120 may be received as a report and/or as a notification, from user database. A "user database," as used herein, is a data structure containing ID 120. Databases as described throughout this disclosure may be implemented, without limitation, as a relational database, a key-value retrieval database such as a NOSQL database, and/or the like. Databases may alternatively or additionally be implemented using a distributed data storage protocol and/or data structure, such as a distributed hash table or the like. Databases may include the Cloud and/or distributed ledger technology (DLT). Further, databases may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistent with this disclosure.

Still referring to FIG. 1, in some embodiments, user database 124 may include a fraud database, which may be populated by a plurality of financial institutions reporting past or present fraudulent activity encountered with a given individual associated with ID 120. A "financial institution," as used herein is an entity engaged in the business of dealing with financial and/or monetary transactions such as deposits, loans, investments, currency exchange, and/or the like. For example, a financial institution may be a bank, credit union, community development financial institution, utilities, government lender, specialized lender, and/or the like. Furthermore, in an embodiment, financial institutions may include mobile or detached financial institutions. This may include phones with banking apps loaded onto them, drive through windows, deposit boxes, and/or ATMs. Fraud data may be received from an immutable sequential listing, also referred to as a blockchain. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered. The immutable sequential listing may include ID 120 wherein only authorized officials may access ID 120. In some embodiments, the immutable sequential listing may be implemented with the Department of Homeland Security (DHS), by having a non-fungible token (NFT) of a social security number (SSN) issued on the immutable sequential listing and only the Government and authorized institutions having access. In some embodiments, fraud data may be received as a result of web indexing. "Web indexing," as used in this disclosure includes methods for indexing the contents of a website or of the Internet as a whole. For example, using a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. Web crawlers may be trained to use ID to track and index publicly available records of fraudulent activity associated with that ID.

Still referring to FIG. 1, apparatus 100 may be configured to generate score 132 as a function of user profile 128 and one or more local fraud risk factors 144. This may be accomplished via score generation module 136. Score 132 may relate to the criminal threat level, or likelihood of a person to commit fraudulent activity. Score 132 may additionally relate to a management proceeding. As used in this disclosure, a "management proceeding" is a procedure associated with a particular threat level that a certified user may undergo in any particular situation. For example, if a person has a high score 132 on a criminal threat level, that score 132 may be associated with a procedure that prompts a bank teller to decline or double check the contents that person has provided using a certain set of steps. apparatus 100 may generate score 132 using a machine-learning process such as a classifier, or other forms of computational algorithms to classify ID datum to score 132 criterion wherein a low score 132 may indicate a person is a low threat/has a low likelihood of committing fraudulent activity again versus a high score 132 indicating a person is likely to commit fraudulent activity again. Score generation module 136 may instantiate a machine learning model and/or neural network. Exemplary non-limiting data that may be used as training data 140 may include, non-limiting exemplary input data such as ID 120, including personal data/identification, fraud data, biographical data, geographical data, and/or the like, local fraud risk factors 144, and/or the like, correlated with exemplary non-limiting output data such as one or more scores 132, fraudulent activity, ID 120, and/or the like. Training of the model and/or network may occur at computing device 104 and/or remotely. Likewise, retraining of the model and/or network may occur at computing device and/or remotely. Outputs of the model and/or network may be used reiteratively as new training data 140. With the introduction of new ID 120 in different forms the model and/or network may be retrained and instantiated at or by computing device 104.

With continued reference to FIG. 1, score 132 indicates the threat level associated with a given individual, given their history of fraud and any other ID associated with said individual. Score 132 also integrates local fraud risk factors 144. As used throughout this disclosure, "local fraud risk factors," are risk factors associated with local fraudulent activity. For example, and without limitation, a local fraud risk factor may include an indication that fraud in a certain area is higher than normal, generating a higher score 132 due to increased risk factors. Apparatus may instantiate a machine-learning model or other form of computational algorithm, as discussed in this disclosure, to classify ID datum to a score 132 criterion. A low score 132 may indicate a person is a low risk/threat to commit fraudulent activity whereas a high score 132 may indicate a person is more likely to commit a fraudulent act. In an exemplary, non-limiting, embodiment, on a scale of 0-800, 0-250 may indicate a clean record; 251-450 may indicate minor infractions, such as without limitation: fake checks, fake bills, and/or the like, under $50K; 451-550 may indicate minor crimes, such as without limitation: fake checks and fraud up to $250K; 551-650 may indicate mid-level crimes, such as, without limitation fraud up to $1 mil; and 650-800 may indicate major crimes such as, without limitation, fraud over $1 mil. Each infraction may indicate a specific point accumulation and may increase in points in relation to the quantity of times any individual infraction is committed. For example, and without limitation, an individual using a fraudulent pay stub to obtain a credit card may not receive as high score 132 as someone using a fraudulent pay stub to obtain a personal/commercial loan. An individual's score 132 may continuously be updated by new ID 120 as it is received. Alternatively, ID 120 may be stored in user database 124 and score 132 may only be updated when computing device requires an indication of score 132.

With continued reference to FIG. 1, apparatus 100 may instantiate secure identification module 148 to optimize the secure identification of a given individual. Secure identification module 148 may instantiate a machine learning model and/or a neural network. Further, training of secure identification module 148 may occur at computing device 104 and/or remotely. Exemplary, nonlimiting training data 152 that may be used to train module 148 may include exemplary inputs such as ID 120, score 132, user profile 128, local fraud risk factors 144, security parameter 156 inputs, and/or the like, correlated to exemplary outputs such as ID 120, score 132, local fraud risk factors 144, security parameter 156 inputs, security parameter 156, and/or the like. Retraining of the model and/or network may take place at computing device 104 and/or remotely. Outputs of the model and/or network may reiteratively be used as new training data 152.

Continuing to reference FIG. 1, following the secure identification of an individual as a function of score 132 and ID 120 initiation of one or more security parameters 156 may occur. Security parameter 156 may act as a secondary check to the identification process. Security parameter 156 may include a password, PIN, additional ID 120, and/or security questions. These may be generated and sent to an individual's on-file contact information. For example, and without limitation, a code may be sent to an individual's phone and/or email. In some embodiments, if presented ID 120 matches the identification of a known fraudster, alert 164 will automatically be generated, and no security parameter 156 will be initiated. Security parameter 156 may be satisfied by input by a user at user interface 160. Input at user interface 160 may include bio scans, such as facial, fingerprint, and/or the like, stagnant, and/or generated, passwords, PINS, and/or the like, and/or phone calls, chatbot interactions, and/or the like. Based on a user's interactions and ID 120 alert 164 may be generated. In some embodiments, security parameter 156 may only be initiated if score 132 meets a threshold. For example, and without limitation, some entities may set score 132 thresholds at lower levels of risk to ensure high security. Alternatively, some entities may set score 132 thresholds at a specific level, indicating that upon reaching said score 132 threshold a security parameter 156 will be initiated.

With further reference to FIG. 1, security parameter 156 may be presented to a user at user interface 160. User interface 160 may include an interactive display. In an embodiment, user interface 160 may include a screen, cameras, microphones, a keypad, and/or the like. User interface 160 may be mobile, such as a mobile cellphone or a tablet. Additionally, user interface 160 may be any display device as described throughout this disclosure. Further, user interface 160 may be more than one interface and may be accessed by one or more individuals at a time. For example, and without limitation, a bank teller may have a user interface 160 they are able to interact with and/or receive alerts and/or other information, whereas an individual presenting a check may additionally have a user interface 160, such as their mobile cellphone. Security parameter 156 input may include any interaction necessary to satisfy the presented security parameter 156. For example, and without limitation, security parameter 156 inputs may include typing, tapping, facial scans, fingerprint scans, voice scans, and/or the like.

Still referring to FIG. 1, apparatus 100 may be configured to generate alert 164 as a function of user profile 128. In an embodiment, alert 164 may be transmitted to a user currently engaged with the person during a transaction. For example, a bank teller may run a person's ID through the system, wherein alert 164 is displayed on a computing device 104 operated by the teller. Alert 164 may include and/or display score 132, a breakdown of score 132, history of fraudulent activity and/or advice for best course of action. A breakdown of score 132 may include one or more criteria used in determining score 132, individual scores based on the criteria that were accumulated, individual threat levels of each fraudulent activity determined, and/or the like. As a non-limiting example, a breakdown of score 132 may include a score for each activity, a score for each fraudulent activity, a listing of the activities that caused the greatest impact on the score, and/or the like. The history of fraudulent activity may include data gathered from geofencing technology to track fraudulent activity of person as a plurality of locations. In some embodiments, advice may be presented as particular protocol of an organization as described above, such as a bank. Course of action may include denying a transaction, alerting the authorities, escalating to a manager and/or the like. As a non-limiting example, an organization may have preset course of action in relation to specific score 132 levels which may be received and displayed by computing device 104. As a non-limiting example, an organization may determine that alerting the authorities is the best course of action whenever an alert 164 with a score 132 higher than 550 is generated. Alternatively, as another non-limiting example, an organization may have various courses of action depending on the magnitude of a specific score 132. As a non-limiting example, if score 132 is over a first threshold, organization's preset course of action may be to deny the transaction, whereas, if score 132 is over a second threshold, organization's preset course of action may be to alert the authorities. In some embodiments, computing device 104 may be communicatively connected to an interbank direct communication channel. An "interbank direct communication channel," as used throughout this disclosure is a channel of communication between a plurality of financial institutions. Computing device 104 may receive fraudulent data of an individual through such a communication channel. For example, if on a Monday a man goes to bank A and tries to cash a fake check for $4,000 but gets declined, they may go to bank B and try the same thing. A manager and/or person at bank A may transmit a BA/WO (Be Aware/Watch Out) through the communication channel so that all banks in the surrounding area may have access to the individual's attempt at cashing a fraudulent check. A BA/WO may include descriptions of the individual who attempted the fraud, information about their attempted fraud, what car they drove, accomplices and/or the like. In some embodiments, a BA/WO may include a fraudster's real information, for example, social security number, driver's license, passport, and/or the like. This information may then be compared against the individual's fake ID and/or multiple fake IDs, which may also be information included in a BA/WO. A BA/WO may be included in alert 164 and may be transmitted through the communication channel to a plurality of devices connected to the system. For example, and without limitation, a plurality of banks may enroll in the system to receive alerts 124 indicating fraudulent activity in their geographical area.

Still referring to FIG. 1, alert 164 including a BA/WO may be transmitted to devices using geofencing technology to optimize the process and ensure relevant recipients are notified. For example, and without limitation, only banks in the Boston area close to a source of fraudulent activity may receive a BA/WO. As used in the current disclosures, a "geofence" is a virtual perimeter or boundary defined by geographic coordinates in a digital mapping system. Geographical coordinates may include a radius from a geographical point, proximity to a landmark, zip codes, area codes, longitude and latitude, cities, states, countries, counties, travel time, and the like. A geofence may be generated as a radius around a point or location or arbitrary borders drawn by a user. In some embodiments, the point or location may be selected by a user through user input, wherein user input may include, as non-limiting examples, tapping on a screen, inputting an address, inputting coordinates, and/or the like. A geofence may be generated to match a predetermined set of boundaries such as neighborhoods, school zones, zip codes, county, state, and/or city limits, area codes, voting districts, geographic regions, streets, rivers, other landmarks, and the like. In embodiments, geofences may be generated as a function of a user input. Geofences may be used in location-based services and applications to trigger specific actions or events when a mobile device or GPS-enabled object enters, exits, or remains within the designated area. In an embodiment, a geofence may include a time-based geofence. In addition to geographical boundaries, time-based geofences trigger events or notifications based on specific time intervals or schedules. For example, a geographic criterion may include a requirement that the user be physically located within the geofenced area for at least one hour. A geofence may include a proximity geofence. As used in the current disclosure, a "proximity geofence" is a virtual boundary or area defined by geographical coordinates which is used to trigger specific actions or events. This may include events such as when a mobile device or object enters or exits that is outlined by the proximity based geofence. This may also include any instance of reporting of fraudulent activity associated with an individual's identification data 120. Proximity geofences are used to trigger events when a device or location is within or near the vicinity of a specific location. They are often used for location-based marketing and notifications. This may be used to let a user know when they are nearing the boundary for the geofenced area. In some embodiments, a geofence may include a dynamic geofence. Dynamic geofences may change in real-time based on variables, such as a user's location, device data, environmental factors, one or more alerts 124, and/or the like. This allows for adaptive and context-aware geofencing applications.

Continuing to reference FIG. 1, the parameters of closeness and/or relevance of transmitting a BA/WO may be determined by a user and/or through a predictive algorithm filtering out financial institutions that have low levels of risk. In some embodiments, generating alert 164 may include a prediction model, such as, without limitation, an inference engine. In an embodiment, a prediction model may be configured to predict the likelihood of an individual committing fraudulent activity at their location in the near future. For example, and without limitation, if data shows an individual has been at three banks in a certain zip-code over the last month, the prediction model may assess whether a bank is likely to be visited by the individual. In an embodiment, the prediction model may determine the probability of the individual's visit, whether a bank is likely the individual's next visit and/or if the individual may visit in a certain time frame. An "inference engine," as used herein is a component of the system that applies logical rules to the knowledge base to deduce new information. The logic that an inference engine uses is typically represented as IF-THEN rules, for example, "if person A has committed fraud 3X in the last year, then person A is likely going to commit fraud again." An inference engine may incorporate machine-learning, deep learning, neural networks, fuzzy logic, artificial intelligence and/or the like.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where $A+B=-R$, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Keys may be generated by random variation in selection of prime numbers, for instance for the purposes of a cryptographic system such as secret that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Still viewing FIG. 1, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Cryptographic system may be configured to generate a session-specific secret. Session-specific secret may include a secret, which may be generated according to any process as described above, that uniquely identifies a particular instance of an attested boot and/or loading of software monitor. Session-specific secret may include without limitation a random number. Session-specific secret may be converted to and/or added to a secure proof, verification datum, and/or key according to any process as described above for generation of a secure proof, verification datum, and/or key from a secret or "seed"; session-specific secret, a key produced therewith, verification datum produced therewith, and/or a secure proof produced therewith may be combined with module-specific secret, a key produced therewith, a verification datum produced therewith, and/or a secure proof produced therewith, such that, for instance, a software monitor and/or other signed element of attested boot and/or attested computing may include secure proof both of session-specific secret and of module-specific secret. In an embodiment, session-specific secret may be usable to identify that a given computation has been performed during a particular attested session, just as device-specific secret may be used to demonstrate that a particular computation has been produced by a particular device. This may be used, e.g., where secure computing module and/or any component thereof is stateless, such as where any such element has no memory that may be overwritten and/or corrupted.

Figure 2:
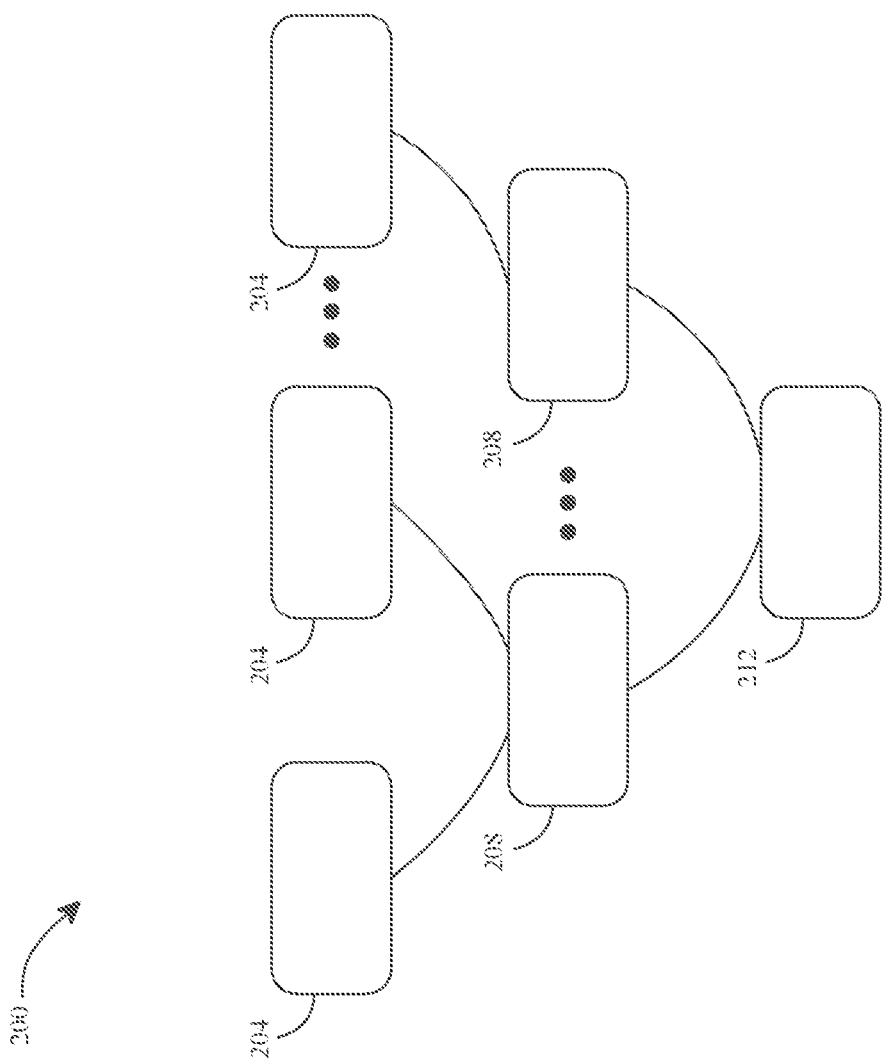
FIG. 2 is an exemplary embodiment of a cryptographic accumulator.

Referring now to FIG. 2, an exemplary embodiment of a cryptographic accumulator 200 is illustrated. A "cryptographic accumulator," as used in this disclosure, is a data structure created by relating a commitment, which may be smaller amount of data that may be referred to as an "accumulator" and/or "root," to a set of elements, such as lots of data and/or collection of data, together with short membership and/or nonmembership proofs for any element in the set. In an embodiment, these proofs may be publicly verifiable against the commitment. An accumulator may be said to be "dynamic" if the commitment and membership proofs can be updated efficiently as elements are added or removed from the set, at unit cost independent of the number of accumulated elements; an accumulator for which this is not the case may be referred to as "static." A membership proof may be referred to as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set. Cryptographic accumulator 200 has a plurality of accumulated elements 204, each accumulated element 204 generated from a lot of the plurality of data lots. Accumulated elements 204 are create using an encryption process, defined for this purpose as a process that renders the lots of data unintelligible from the accumulated elements 204; this may be a one-way process such as a cryptographic hashing process and/or a reversible process such as encryption. Cryptographic accumulator 200 further includes structures and/or processes for conversion of accumulated elements 204 to root 212 element. For instance, and as illustrated for exemplary purposes in FIG. 2, cryptographic accumulator 200 may be implemented as a Merkle tree and/or hash tree, in which each accumulated element 204 created by cryptographically hashing a lot of data. Two or more accumulated elements 204 may be hashed together in a further cryptographic hashing process to produce a node 208 element; a plurality of node 208 elements may be hashed together to form parent nodes 208, and ultimately a set of nodes 208 may be combined and cryptographically hashed to form root 212. Contents of root 212 may thus be determined by contents of nodes 208 used to generate root 212, and consequently by contents of accumulated elements 204, which are determined by contents of lots used to generate accumulated elements 204. As a result of collision resistance and avalanche effects of hashing algorithms, any change in any lot, accumulated element 204, and/or node 208 is virtually certain to cause a change in root 212; thus, it may be computationally infeasible to modify any element of Merkle and/or hash tree without the modification being detectable as generating a different root 212. In an embodiment, any accumulated element 204 and/or all intervening nodes 208 between accumulated element 204 and root 212 may be made available without revealing anything about a lot of data used to generate accumulated element 204; lot of data may be kept secret and/or demonstrated with a secure proof as described below, preventing any unauthorized party from acquiring data in lot.

Alternatively or additionally, and still referring to FIG. 2, cryptographic accumulator 200 may include a "vector commitment" which may act as an accumulator in which an order of elements in set is preserved in its root 212 and/or commitment. In an embodiment, a vector commitment may be a position binding commitment and can be opened at any position to a unique value with a short proof (sublinear in the length of the vector). A Merkle tree may be seen as a vector commitment with logarithmic size openings. Subvector commitments may include vector commitments where a subset of the vector positions can be opened in a single short proof (sublinear in the size of the subset). Persons skilled in the art, upon reviewing the entirety of this disclosure, will be aware of various alternative or additional cryptographic accumulators 200 that may be used as described herein. In addition to Merkle trees, accumulators may include without limitation RSA accumulators, class group accumulators, and/or bi-linear pairing-based accumulators. Any accumulator may operate using one-way functions that are easy to verify but infeasible to reverse, i.e. given an input it is easy to produce an output of the one-way function, but given an output it is computationally infeasible and/or impossible to generate the input that produces the output via the one-way function. For instance, and by way of illustration, a Merkle tree may be based on a hash function as described above. Data elements may be hashed and grouped together. Then, the hashes of those groups may be hashed again and grouped together with the hashes of other groups; this hashing and grouping may continue until only a single hash remains. As a further non-limiting example, RSA and class group accumulators may be based on the fact that it is infeasible to compute an arbitrary root of an element in a cyclic group of unknown order, whereas arbitrary powers of elements are easy to compute. A data element may be added to the accumulator by hashing the data element successively until the hash is a prime number and then taking the accumulator to the power of that prime number. The witness may be the accumulator prior to exponentiation. Bi-linear paring-based accumulators may be based on the infeasibility found in elliptic curve cryptography, namely that finding a number k such that adding P to itself k times results in Q is impractical, whereas confirming that, given 4 points P, Q, R, S, the point, P needs to be added as many times to itself to result in Q as R needs to be added as many times to itself to result in S, can be computed efficiently for certain elliptic curves.

Figure 3:
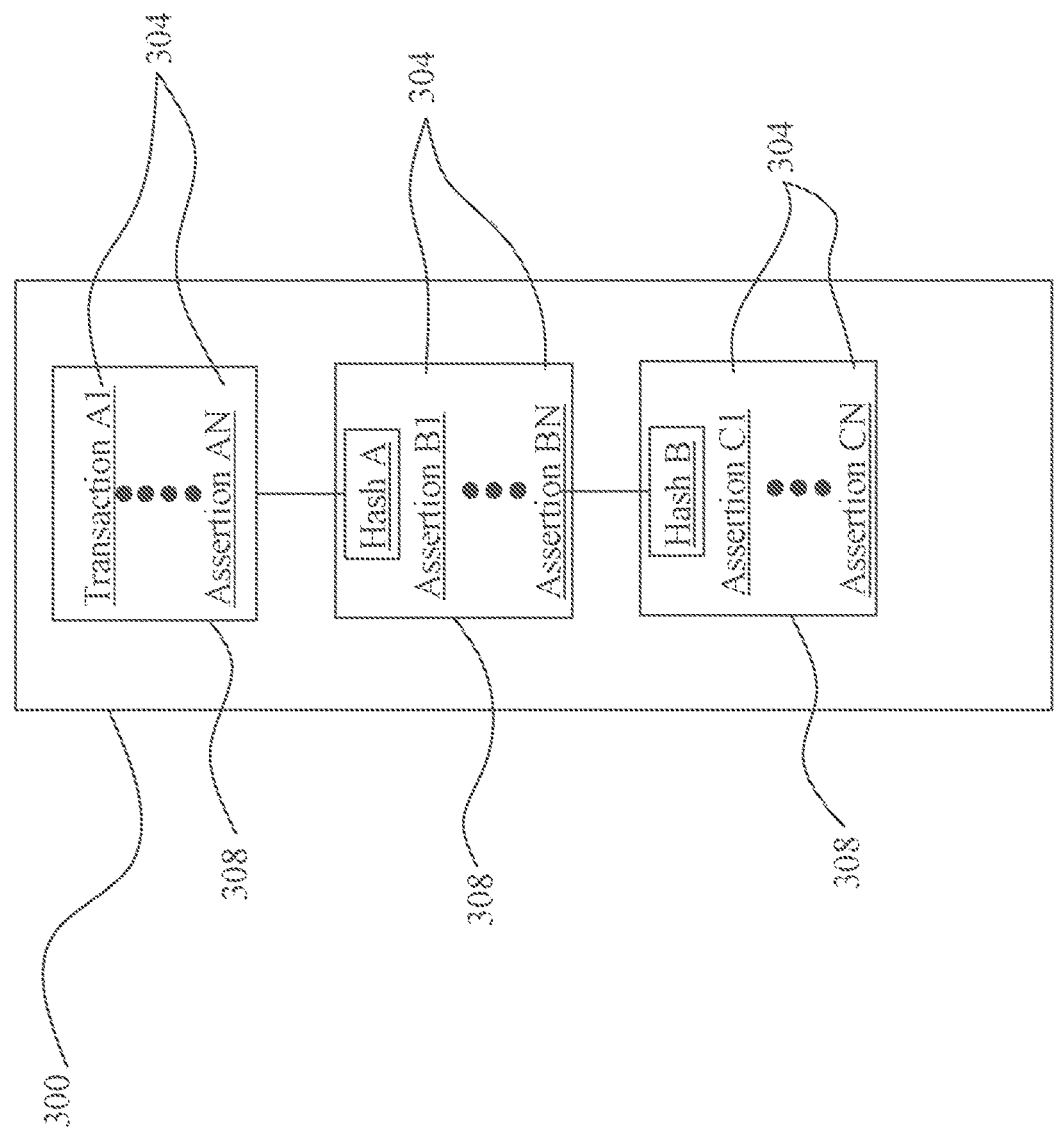
FIG. 3 is a block diagram of an immutable sequential listing.

Referring now to FIG. 3, an exemplary embodiment of an immutable sequential listing 300 is illustrated. Data elements are listed in immutable sequential listing 300; data elements may include any form of data, including textual data, image data, encrypted data, cryptographically hashed data, and the like. Data elements may include, without limitation, one or more at least a digitally signed assertion. In one embodiment, a digitally signed assertion 304 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 304. In an embodiment, collection of textual data states that the owner of a certain transferable item represented in a digitally signed assertion 304 register is transferring that item to the owner of an address. A digitally signed assertion 304 may be signed by a digital signature created using the private key associated with the owner's public key, as described above.

Still referring to FIG. 3, a digitally signed assertion 304 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 304 may describe the transfer of a physical good; for instance, a digitally signed assertion 304 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 304 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 3, in one embodiment, an address is a textual datum identifying the recipient of virtual currency or another item of value in a digitally signed assertion 304. In some embodiments, address is linked to a public key, the corresponding private key of which is owned by the recipient of a digitally signed assertion 304. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 304 may record a subsequent a digitally signed assertion 304 transferring some or all of the value transferred in the first a digitally signed assertion 304 to a new address in the same manner. Digitally signed assertion 304 may contain textual information that is not a transfer of some item of value in addition to, or as an alternative to, such a transfer. For instance, as described in further detail below, a digitally signed assertion 304 may indicate a confidence level associated with a distributed storage node as described in further detail below.

In an embodiment, and still referring to FIG. 3 immutable sequential listing 300 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 300 may be stored as one or more zero knowledge sets (ZKS), Private Information Retrieval (PIR) structure, or any other structure that allows checking of membership in a set by querying with specific properties. Such a database may incorporate protective measures to ensure that malicious actors may not query the database repeatedly in an effort to narrow the members of a set to reveal uniquely identifying information of a given posted content.

Still referring to FIG. 3, immutable sequential listing 300 may preserve the order in which the at least a posted content took place by listing them in chronological order. Alternatively or additionally, immutable sequential listing 300 may organize digitally signed assertions 304 into sub-listings 308 such as "blocks" in a blockchain, which may themselves be collected in a temporally sequential order. Digitally signed assertions 304 within a sub-listing 308 may or may not be temporally sequential. The ledger may preserve the order in which at least a posted content took place by listing them in sub-listings 308 and placing the sub-listings 308 in chronological order. The immutable sequential listing 300 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 300 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 3, immutable sequential listing 300, once formed, may be inalterable by any party, no matter what access rights that party possesses. For instance, immutable sequential listing 300 may include a hash chain, in which data is added during a successive hashing process to ensure non-repudiation. Immutable sequential listing 300 may include a block chain. In one embodiment, a block chain is immutable sequential listing 300 that records one or more new at least a posted content in a data item known as a sub-listing 308 or "block." An example of a block chain is the BITCOIN block chain used to record BITCOIN transactions and values. Sub-listings 308 may be created in a way that places the sub-listings 308 in chronological order and link each sub-listing 308 to a previous sub-listing 308 in the chronological order so that any computing device may traverse the sub-listings 308 in reverse chronological order to verify any at least a posted content listed in the block chain. Each new sub-listing 308 may be required to contain a cryptographic hash describing the previous sub-listing 308. In some embodiments, the block chain contains a single first sub-listing 308 sometimes known as a "genesis block."

Still referring to FIG. 3, the creation of a new sub-listing 308 may be computationally expensive; for instance, the creation of a new sub-listing 308 may be designed by a "proof of work" protocol accepted by all participants in forming the immutable sequential listing 300 to take a powerful set of computing devices a certain period of time to produce. Where one sub-listing 308 takes less time for a given set of computing devices to produce the sub-listing 308 protocol may adjust the algorithm to produce the next sub-listing 308 so that it will require more steps; where one sub-listing 308 takes more time for a given set of computing devices to produce the sub-listing 308 protocol may adjust the algorithm to produce the next sub-listing 308 so that it will require fewer steps. As an example, protocol may require a new sub-listing 308 to contain a cryptographic hash describing its contents; the cryptographic hash may be required to satisfy a mathematical condition, achieved by having the sub-listing 308 contain a number, called a nonce, whose value is determined after the fact by the discovery of the hash that satisfies the mathematical condition. Continuing the example, the protocol may be able to adjust the mathematical condition so that the discovery of the hash describing a sub-listing 308 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 308 according to the protocol is known as "mining." The creation of a new sub-listing 308 may be designed by a "proof of stake" protocol as will be apparent to those skilled in the art upon reviewing the entirety of this disclosure.

Continuing to refer to FIG. 3, in some embodiments, protocol also creates an incentive to mine new sub-listings 308. The incentive may be financial; for instance, successfully mining a new sub-listing 308 may result in the person or entity that mines the sub-listing 308 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 308 Each sub-listing 308 created in immutable sequential listing 300 may contain a record or at least a posted content describing one or more addresses that receive an incentive, such as virtual currency, as the result of successfully mining the sub-listing 308.

With continued reference to FIG. 3, where two entities simultaneously create new sub-listings 308, immutable sequential listing 300 may develop a fork; protocol may determine which of the two alternate branches in the fork is the valid new portion of the immutable sequential listing 300 by evaluating, after a certain amount of time has passed, which branch is longer. "Length" may be measured according to the number of sub-listings 308 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 308 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 300 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 300.

Still referring to FIG. 3, additional data linked to at least a posted content may be incorporated in sub-listings 308 in the immutable sequential listing 300; for instance, data may be incorporated in one or more fields recognized by block chain protocols that permit a person or computer forming a at least a posted content to insert additional data in the immutable sequential listing 300. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 3, in some embodiments, virtual currency is traded as a crypto-currency. In one embodiment, a crypto-currency is a digital, currency such as Bitcoins, Peercoins, algorand, cardano, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 308 in a block chain computationally challenging; the incentive for producing sub-listings 308 may include the grant of new crypto-currency to the miners. Quantities of crypto-currency may be exchanged using at least a posted content as described above.

Figure 4:
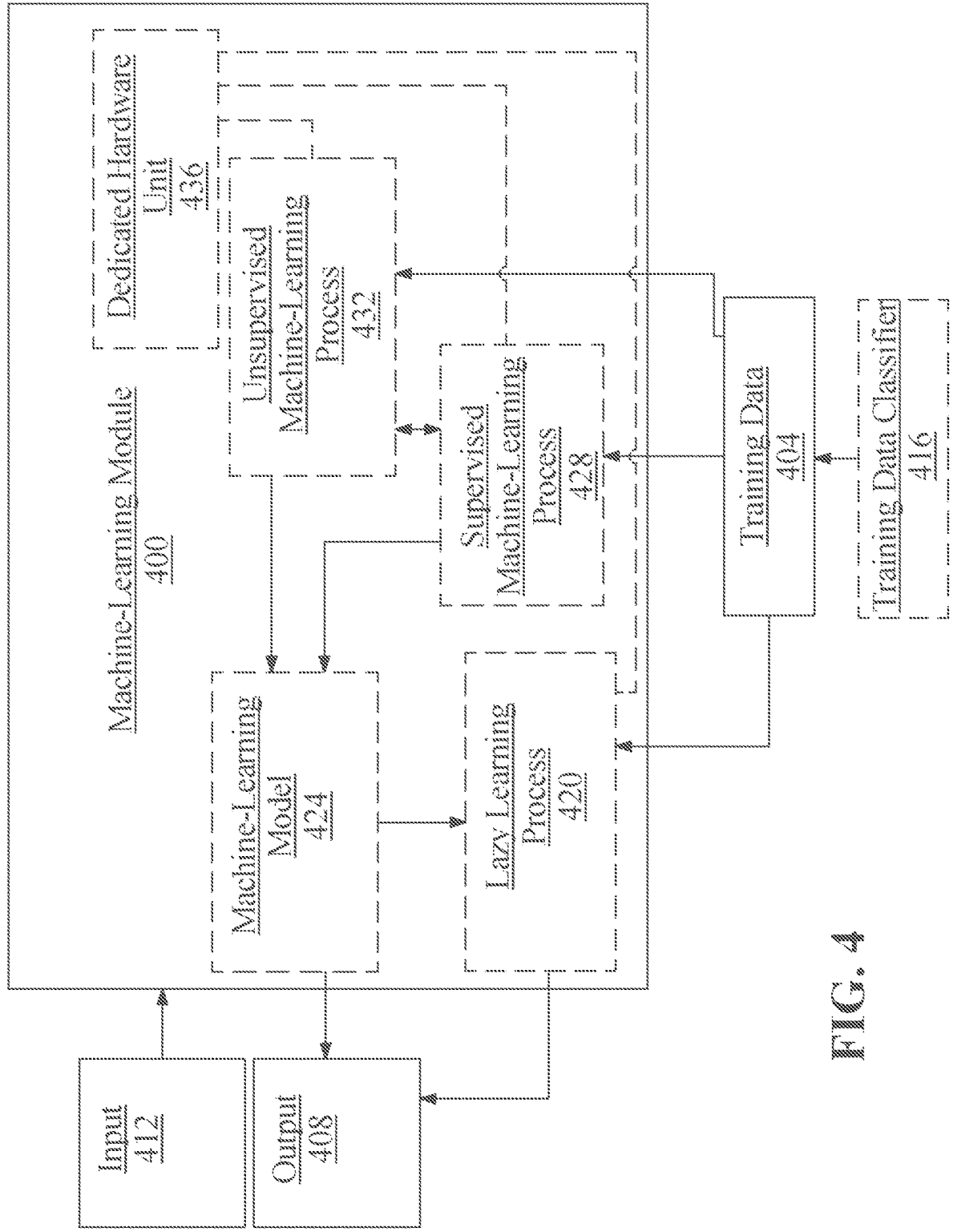
FIG. 4 is a block diagram of exemplary embodiment of a machine learning model.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative inputs may include identification data, such as biographical data, geographical data, fraudulent data, and/or the like associated with an individual's ID, and outputs may include a generated score, predicted fraudulent level, and/or the like. Further, an additional non-limiting example of system 100 may utilize machine learning module 400 to adapt to the methods employed by fraudsters. Non-limiting illustrative inputs of this embodiment may include the types of scams, schemes and/or fraudulent activity conducted over the course of history, especially in the present, along with trends and developing technologies in the present and outputs may include generated score, predicted fraudulent level, and/or the like. A machine-learning model and/or module may be trained, without limitation, using training data that includes historical examples of fraudulent transactions; training may include unsupervised processes to detect patterns, such as unsupervised pretraining processes, to detect patterns associated with fraudulent activity. Alternatively or additionally, historical data and/or one or more elements thereof may be labeled by users to identify fraudulent activity, and used in a supervised machine-learning algorithm to train machine-learning model.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to specific threat levels related to an individual's score, such as, without limitation clean record, minor infraction, minor crime, mid-level crime, and/or major crime. Further, these cohorts may additionally be related to classifications of specific activities that are further associated with specific scores that place an individual into the prior listed categories.

Still referring to FIG. 4, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 4, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 4, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 4, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $X_{max}$:

$$X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Sealing may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 4, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described above as inputs, outputs described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
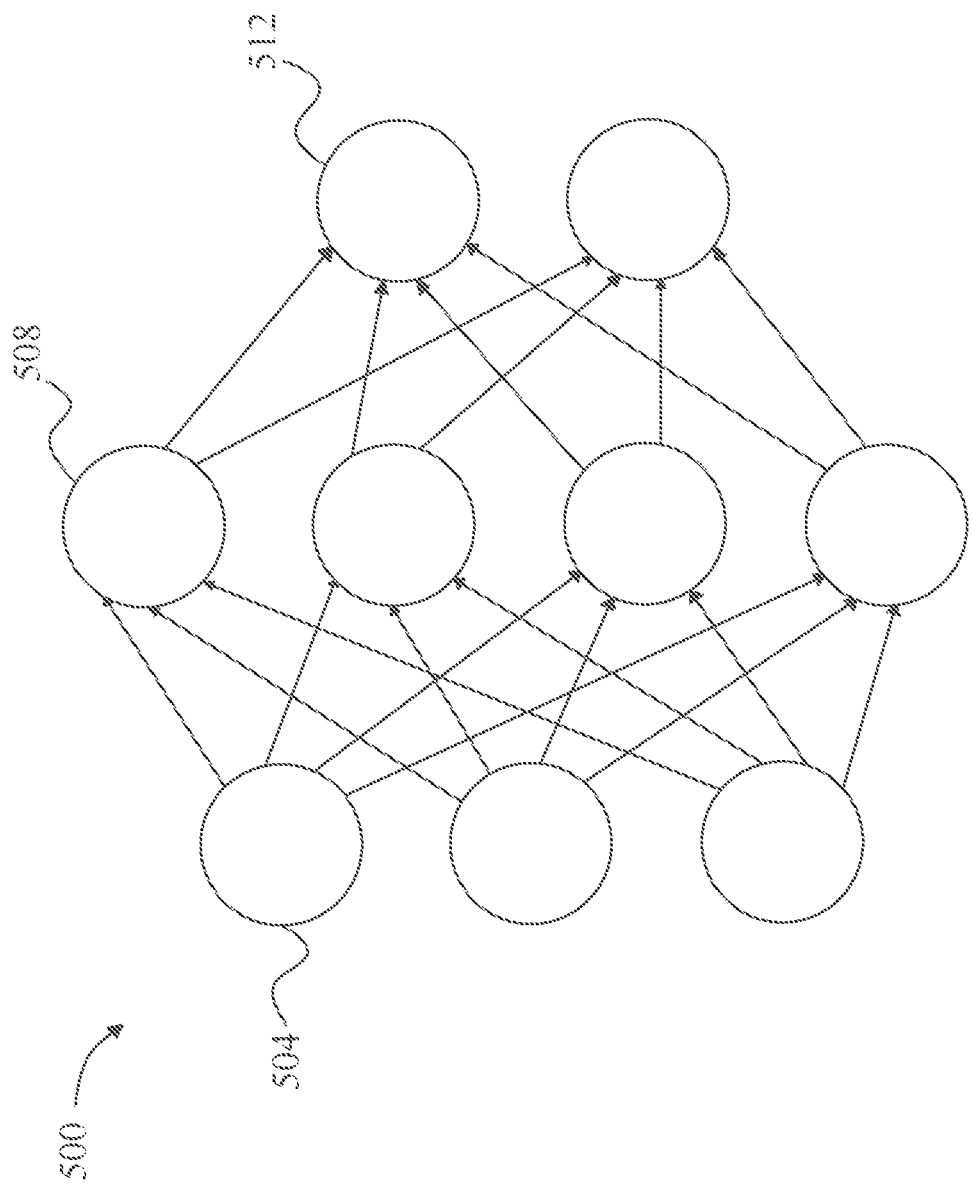
FIG. 5 illustrates an exemplary nodal network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
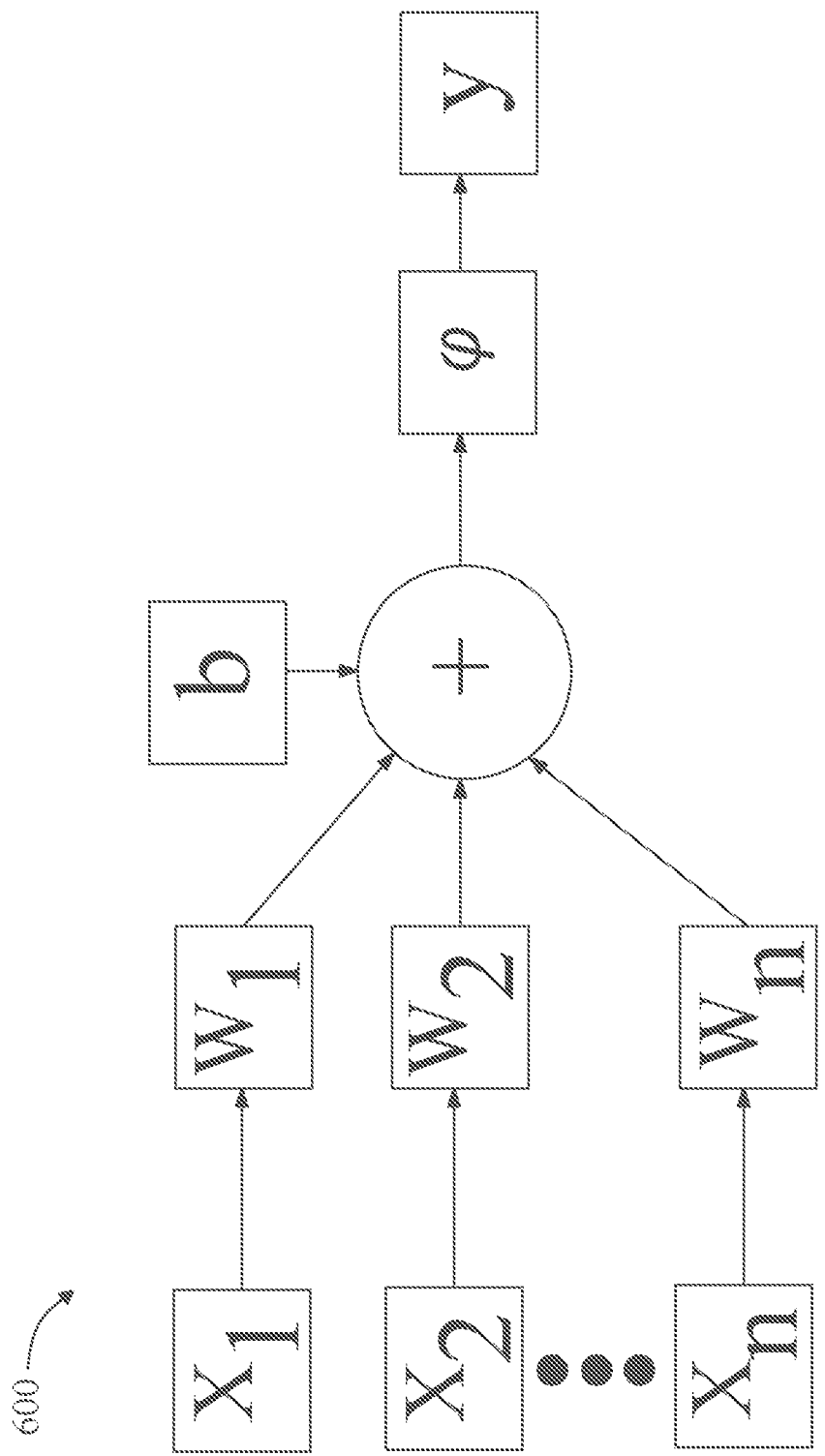
FIG. 6 is a block diagram of an exemplary node of a neural network.

Referring now to FIG. 6, an exemplary embodiment of a node 600 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tan (hyperbolic tangent) function, of the form $$\frac{e^x - e^{-x}}{e^x + e^{-x}},$$

a tanh derivative function such as $f(x) = \tanh^2(x)$, a rectified linear unit function such as $f(x) = \max(0, x)$, a "leaky" and/or "parametric" rectified linear unit function such as $f(x) = \max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x) = x*\text{sigmoid}(x)$, a Gaussian error linear unit function such as $f(x) = a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
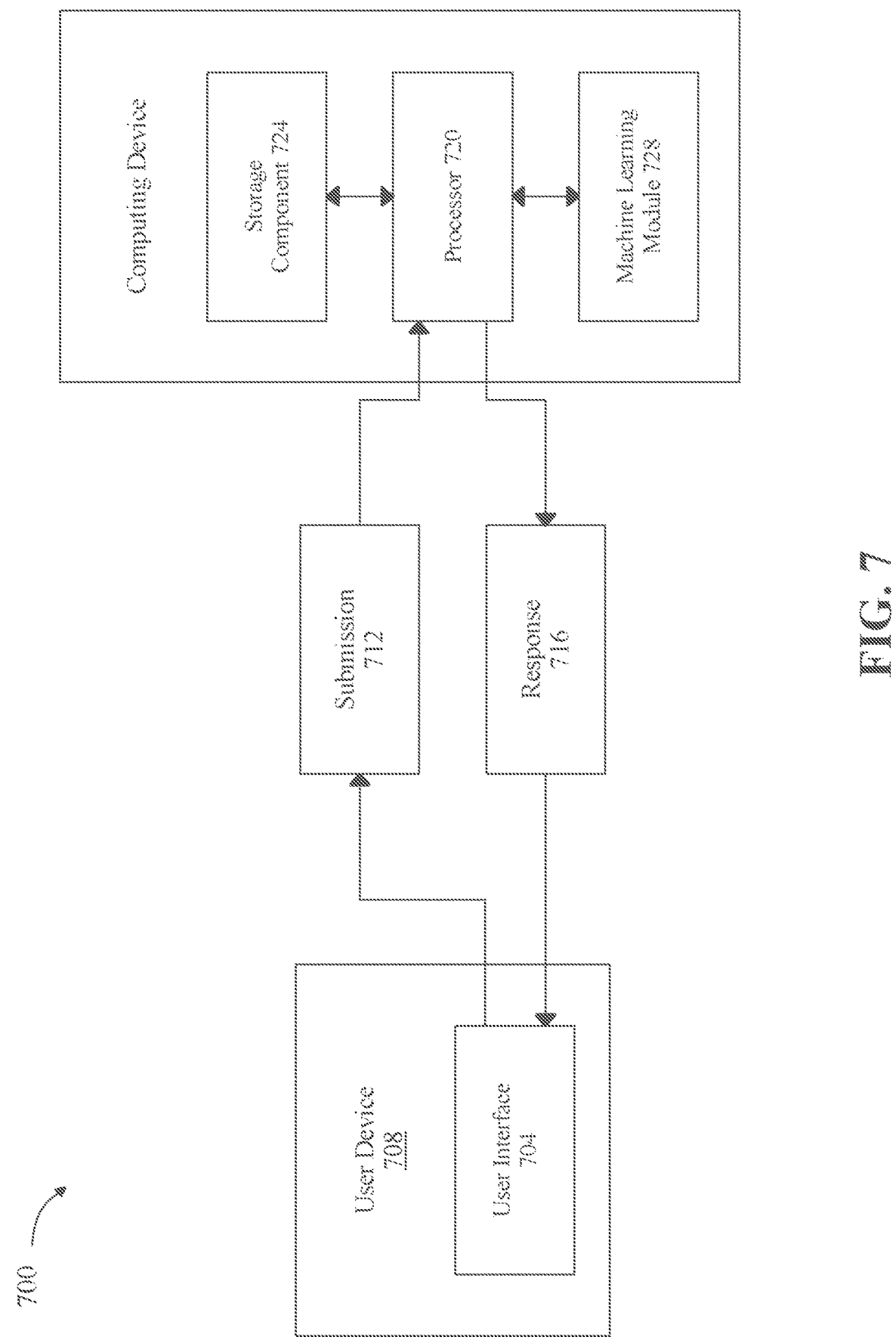
FIG. 7 a chatbot system is schematically illustrated.

Referring to FIG. 7, a chatbot system is schematically illustrated. According to some embodiments, user interface 704 may be communicative with a computing device that is configured to operate a chatbot. In some cases, user interface 704 may be local to computing device 104. Alternatively or additionally, in some cases, user interface 704 may remote to computing device 104 and communicative with the computing device, by way of one or more networks, such as without limitation the internet. Alternatively or additionally, user interface 704 may communicate with user device 708 using telephonic devices and networks, such as without limitation fax machines, short message service (SMS), or multimedia message service (MMS). Commonly, user interface 704 communicates with computing device 104 using text-based communication, for example without limitation using a character encoding protocol, such as American Standard for Information Interchange (ASCII). Typically, a user interface 704 conversationally interfaces a chatbot, by way of at least a submission 712, from the user interface 704 to the chatbot, and a response 716, from the chatbot to the user interface 704. In many cases, one or both submission 712 and response 716 are text-based communication. Alternatively or additionally, in some cases, one or both of submission 712 and response 716 are audio-based communication.

Continuing in reference to FIG. 7, a submission 712 once received by computing device 104 operating a chatbot, may be processed by a processor. In some embodiments, processor 720 processes submission 712 using one or more keyword recognition, pattern matching, and/or natural language processing. In some embodiments, processor 720 may employ real-time learning with evolutionary algorithms. In some cases, processor 720 may retrieve a pre-prepared response from at least a storage component 724, based upon submission 712. Alternatively or additionally, in some embodiments, processor 720 communicates a response 716 without first receiving a submission 712, thereby initiating conversation. In some cases, processor 720 communicates an inquiry to user interface 704; and the processor is configured to process an answer to the inquiry in a following submission 712 from the user interface 704. In some cases, an answer to an inquiry present within a submission 712 from a user device 704 may be used by computing device 104 as an input to another function. Chatbot 700 may further deliver security questions and or provide a user with additional information regarding a transaction.

With further reference to FIG. 7, chatbot 700 may instantiate machine learning module 728. Machine learning module 728 may instantiate a machine learning model and/or a neural network. Training of the model and/or network may occur at system 700 and/or remotely. Training data that may be utilized is exemplary inputs such as submissions 712, responses 712, security questions, security answers, stored interactions from storage component 724 correlated with exemplary non-limiting output such as submissions 712, responses 712, security questions, security answers, stored interactions from storage component 712. Stored interactions from storage component 712 may include tracked interactions of a specific user or individual, including, but not limited to, geographical location, pattern of use, and/or any tracked interaction as described throughout this disclosure. Retraining of the model and/or network may occur at system 700 and/or remotely. Outputs of machine learning model 728 may be reiteratively used as new training data.

Figure 8:
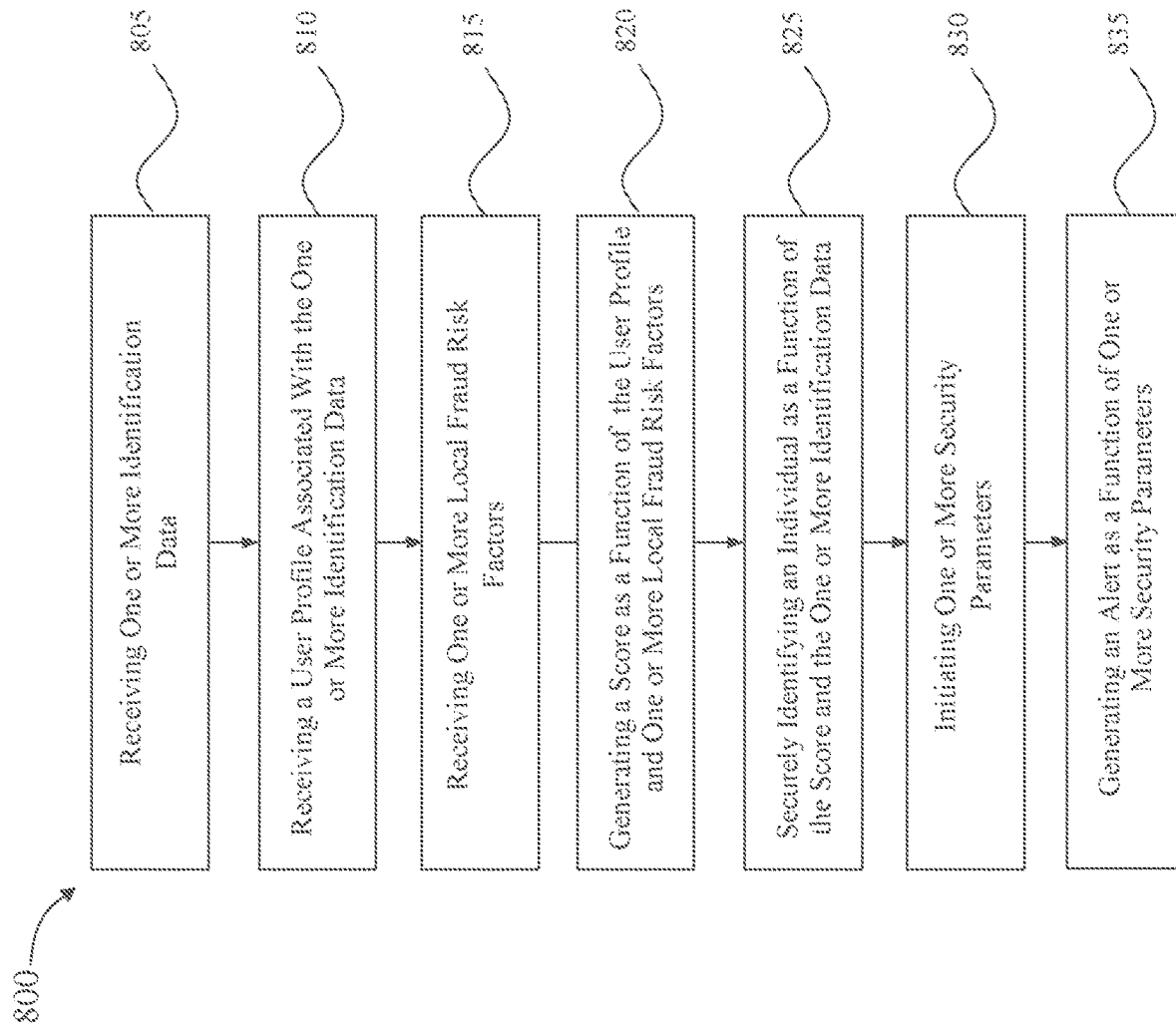
FIG. 8 is a flow diagram illustrating an exemplary method for tracking fraudulent activity.

Now referring to FIG. 8, a flow diagram of an exemplary method for tracking fraudulent activity that will impact financial and economic integrity is illustrated. In an embodiment, a method for tracking fraudulent activity that will impact financial and economic integrity includes receiving one or more ID 305, receiving a user profile associated with the one or more ID 810, receiving one or more local fraud risk factors 815, generating a score as a function of the user profile and one or more local fraud risk factors 820, securely identifying an individual as a function of the score and the one or more identification data 825, initiating one or more security parameters 830, and generating an alert as a function of the user profile 835 Method 800 may allow increased security for the systems that implement it. Additionally, method 800, in some embodiments, provides for the generation of a score that assists its user in determining the level of care to be taken when dealing with the individual associated with the presented ID. In some embodiments, method 800 may be utilized in a way that security alone is accomplished. For example, and without limitation, when using an ATM in a new place not yet associated with an individual's ID, the ATM may require presentation of additional ID. Alternatively, method 800 may be utilized by way of its scoring system to indicate to a user what an individual's score may be. This may allow a user to understand where an individual associated with particular ID scores on the scoring system. For example, and without limitation, a score may indicate high or low levels of fraud. This may be particularly beneficial when screening an individual for a job that handles exchanges of money. Further, each of these attributes of method 800 may be used in tandem. Together method 800 optimizes the tracking of fraudulent activity and may in some embodiments, even produce a predictive model for future fraud risk that may be communicated to relevant parties. Relevant parties may be determined on a geographical basis and/or specifically based on certain risk factors.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
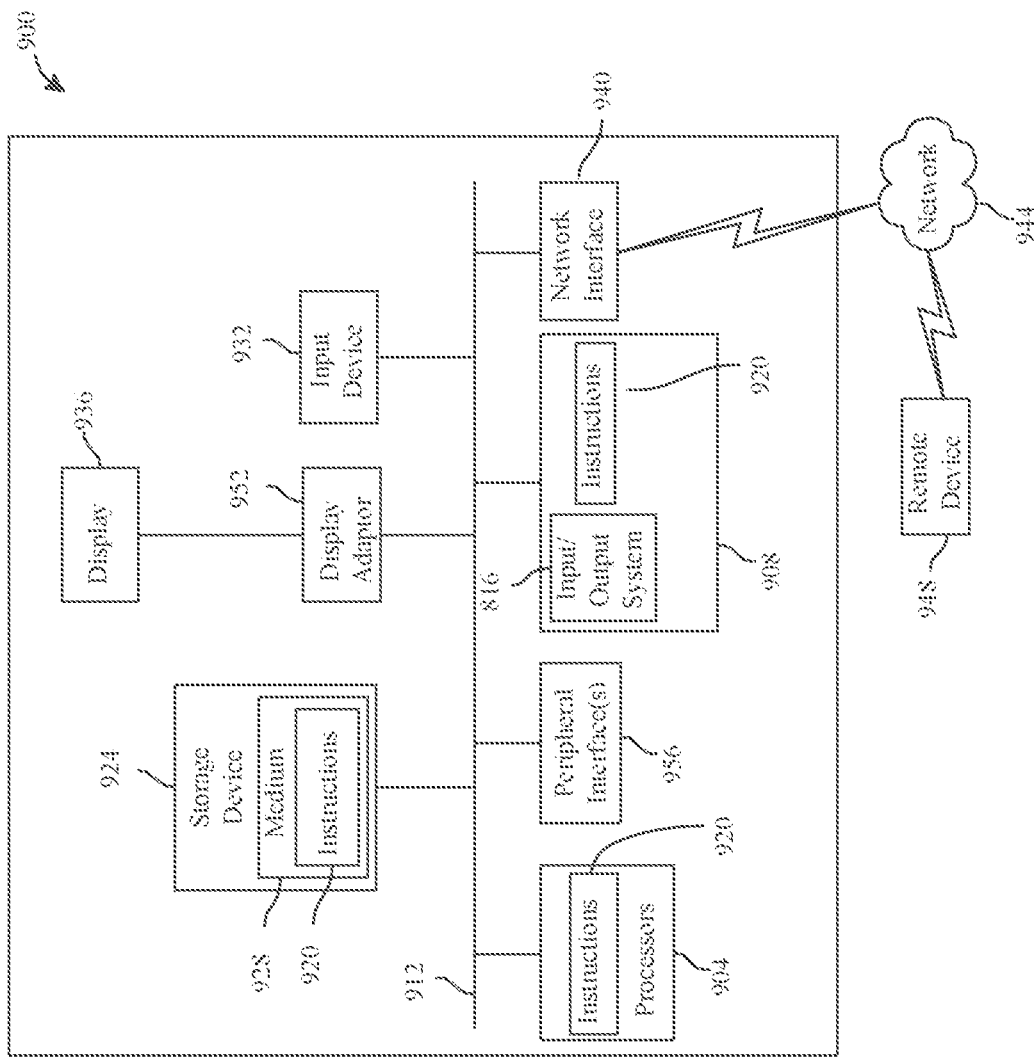
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 962 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 962 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 966. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatuses, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for tracking fraudulent activity that will impact financial and economic integrity, the apparatus comprising:
    a user database;
    at least a processor; and
    a memory communicatively connected to the processor, the memory containing instructions configuring the processor to:
    receive one or more identification data;
    receive, from the user database, a user profile associated with one or more identification data;
        receive, from the user database, one or more local fraud risk factors including geofence information;
        generate a fraud risk score as a function of the user profile and one or more local fraud risk factors utilizing a multilayer neural network score generation module which comprises:
            receiving training data, wherein the training data correlates a plurality of identification data and one or more local fraud risk factor data to a plurality of score data;
    training the multilayer neural network iteratively by filtering, sorting, and classifying training data using supervised or unsupervised classifiers; retraining the multilayer neural network based on updated fraud outcomes and feedback from previous scoring iterations, thereby progressively improving fraud-risk scoring accuracy;
    securely identify an individual based on the fraud risk score and one or more identification data;
        initiate one or more security parameters;
        generate an alert as a function of the user profile whose content and severity are determined by the user profile risk tier; and
        record, in an immutable hash-chained distributed ledger, the fraud risk score, the invoked counter-measure, and a time stamp to create a tamper-evident audit trail.

2. The apparatus of claim 1, wherein identification data comprises biographical data.

3. The apparatus of claim 1, wherein identification data comprises geographic data.

4. The apparatus of claim 1, wherein generation of the score based on the identification data instantiates a machine learning model.

5. The apparatus of claim 1, wherein generation of the score based on the identification data instantiates a neural network.

6. The apparatus of claim 1, wherein securely identifying the individual based on the score and one or more identification data instantiates a machine learning model.

7. The apparatus of claim 1, wherein securely identifying the individual based on the score and one or more identification data instantiates a neural network.

8. The apparatus of claim 1, wherein one or more security parameters are stored within the user profile.

9. Apparatus of claim 1, wherein generation of the alert based on one or more security parameters comprises the score, a breakdown of the score, and the individual's score history.

10. The apparatus of claim 9, wherein the generated alert updates the associated user profile, stored in the user database.

11. A method for tracking fraudulent activity that will impact financial and economic integrity, the method comprising:
    receiving one or more identification data;
    receiving, from the user database, a user profile associated with one or more identification data;
    receiving, from the user database, one or more local fraud risk factors, including geofence information;
    generating a fraud risk score as a function of a user profile and one or more local fraud risk factors utilizing a multilayer neural network score generation module which comprises:
        receiving training data, wherein the training data correlates a plurality of identification data and one or more local fraud risk factor data to a plurality of score data;
    training, iteratively, the multilayer neural network using the training data, wherein training includes filtering, sorting, and classifying the training data using supervised or unsupervised classifiers, and includes retraining the multilayer neural network with feedback from previous iterations of the multilayer neural network; and
    generating the fraud risk score using the trained multilayer neural network;
securely identifying an individual as a function of the fraud risk score and the identification data;
initiating one or more security parameters;
generating an alert whose content and severity correspond to a risk tier stored in the user profile; and
recording, in an immutable hash-chained distributed ledger, the fraud-risk score, the invoked security parameters, and a time stamp to create a tamper-evident audit trail.

12. The method of claim 11, wherein identification data comprises biographical data.

13. The method of claim 11, wherein identification data comprises geographic data.

14. The method of claim 11, wherein generation of the score based on the identification data instantiates a machine learning model.

15. The method of claim 11, wherein generation of the score based on the identification data instantiates a neural network.

16. The method of claim 11, wherein securely identifying the individual based on the score and one or more identification data instantiates a machine learning model.

17. The method of claim 11, wherein securely identifying the individual based on the score and one or more identification data instantiates a neural network.

18. The method of claim 11, wherein one or more security parameters are stored within the user profile.

19. The method of claim 11, wherein generation of the alert based on one or more security parameters comprises the score, a breakdown of the score, and the individual's score history.

20. The method of claim 19, wherein the generated alert updates the associated user profile, stored in the user database.

* * * * *